United States Patent
Xiao et al.

(10) Patent No.: US 10,939,462 B2
(45) Date of Patent: *Mar. 2, 2021

(54) DEVICE-TO-DEVICE D2D COMMUNICATIONS METHOD, APPARATUS, AND SYSTEM

(71) Applicant: HUAWEI TECHNOLOGIES CO., LTD., Shenzhen (CN)

(72) Inventors: Xiao Xiao, Beijing (CN); Brian Classon, Beijing (CN); Jiansong Gan, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/683,291

(22) Filed: Nov. 14, 2019

(65) Prior Publication Data
US 2020/0084795 A1 Mar. 12, 2020

Related U.S. Application Data

(63) Continuation of application No. 15/947,866, filed on Apr. 9, 2018, now Pat. No. 10,492,218, which is a
(Continued)

(51) Int. Cl.
*H04W 72/12* (2009.01)
*H04W 16/14* (2009.01)
(Continued)

(52) U.S. Cl.
CPC ....... *H04W 72/1294* (2013.01); *H04W 16/14* (2013.01); *H04W 72/042* (2013.01);
(Continued)

(58) Field of Classification Search
CPC .................. H04W 72/1294; H04W 76/23
See application file for complete search history.

(56) References Cited

U.S. PATENT DOCUMENTS

| 2014/0023008 A1 | 1/2014 | Ahn et al. |
| 2015/0181406 A1 | 6/2015 | Seo et al. |

(Continued)

FOREIGN PATENT DOCUMENTS

| CN | 104244443 A | 12/2014 |
| CN | 104284340 A | 1/2015 |

(Continued)

OTHER PUBLICATIONS

Kyocera, Multiple transmissions to different destinations from the UE-to-Network Relay. 3GPP TSG RAN WG1 Meeting #82, Beijing, China, Aug. 24-28, 2015, R1-154010, 10 pages.
(Continued)

*Primary Examiner* — Deepa Belur
(74) *Attorney, Agent, or Firm* — Kilpatrick Townsend & Stockton LLP

(57) ABSTRACT

Embodiments of the present invention propose a D2D communications method, apparatus, and system. In the solution, a D2D SPS available period in which a first terminal is capable of using a D2D SPS resource is greater than one SC period. Therefore, in the D2D SPS available period, the first terminal needs to determine the D2D SPS resource only one time, and a second terminal also needs to decode SCI only one time to determine the D2D SPS resource. In this way, the first terminal does not need to determine a D2D SPS resource in each SC period, and the second terminal also does not need to decode SCI in each SC period to determine the D2D SPS resource. Therefore, D2D communication efficiency is improved.

20 Claims, 6 Drawing Sheets

Related U.S. Application Data continuation of application No. PCT/CN2015/092947, filed on Oct. 27, 2015.

(51) Int. Cl.
*H04W 76/23* (2018.01)
*H04W 76/14* (2018.01)
*H04W 72/04* (2009.01)

(52) U.S. Cl.
CPC ......... *H04W 72/048* (2013.01); *H04W 76/14* (2018.02); *H04W 76/23* (2018.02)

(56) References Cited

U.S. PATENT DOCUMENTS

| | | | |
|---|---|---|---|
| 2016/0128066 A1 | 5/2016 | Park et al. | |
| 2016/0286465 A1 | 9/2016 | Wu et al. | |
| 2016/0338094 A1 | 11/2016 | Faurie et al. | |
| 2016/0338095 A1* | 11/2016 | Faurie | H04W 28/0278 |
| 2017/0013605 A1* | 1/2017 | Li | H04W 76/14 |
| 2018/0234220 A1 | 8/2018 | Yasukawa et al. | |
| 2019/0174530 A1 | 6/2019 | Kim et al. | |
| 2019/0306835 A1* | 10/2019 | Hoang | H04W 72/082 |

FOREIGN PATENT DOCUMENTS

| | | |
|---|---|---|
| CN | 104365150 A | 2/2015 |
| CN | 104936294 A | 9/2015 |
| WO | 2015020356 A1 | 2/2015 |
| WO | 2015050396 A1 | 4/2015 |
| WO | 2015081561 A1 | 6/2015 |
| WO | 2015142132 A1 | 9/2015 |
| WO | 2017135998 A1 | 8/2017 |

OTHER PUBLICATIONS

LG Electronics, Scheduling of D2D transmissions for D2D Communication. 3GPP TSG-RAN WG2 #86, Seoul, Republic of Korea, May 19 23, 2014, R2-142433, 3 pages.

Huawei, HiSilicon, Enhancement on mode 2. 3GPP TSG RAN WG1 Meeting #82bis Malmo, Sweden, Oct. 5-9, 2015, R1-155124, 5 pages.

"3GPP TS 36.321 V12.7.0 3rd Generation Partnership Project;Technical Specification Group Radio Access Network; Evolved Universal Terrestrial Radio Access (E-UTRA);Medium Access Control (MAC) protocol specification(Release 12),Technical Specification, 2015-09, 77 pages".

"3GPP TS 36.213 V12.7.0 3rd Generation Partnership Project;Technical Specification Group Radio Access Network; Evolved Universal Terrestrial Radio Access (E-UTRA);Physical layer procedures(Release 12),Technical Specification, 2015-09, 241 pages".

"3GPP TS 36.331 V12.7.0 3rd Generation Partnership Project;Technical Specification Group Radio Access Network; Evolved Universal Terrestrial Radio Access (E-UTRA);Radio Resource Control (RRC);Protocol specification(Release 12),Technical Specification, 2015-09, 453 pages".

Qualcomm Incorporated:"eNB resource allocation for D2D broadcast communication", 3GPP TSG-RAN WG1 #76BIS, R1-141451, XP050787120, Shenzhen, China, Mar. 31-Apr. 4, 2014, total 6 pages.

Huawei, HiSilicon:"SA content for D2D broadcast communication", 3GPP TSG RAN WG1 Meeting #78, R1-142838. Dresden, Germany, Aug. 18-22, 2014. total 6 pages.

* cited by examiner

DEVICE-TO-DEVICE D2D COMMUNICATIONS METHOD, APPARATUS, AND SYSTEM

CROSS-REFERENCE TO RELATED APPLICATIONS

This application is a continuation of U.S. patent application Ser. No. 15/947,866, filed on Apr. 9, 2018, which is a continuation of International Application No. PCT/CN2015/092947, filed on Oct. 27, 2015, the disclosure of which is hereby incorporated by reference in its entirety.

TECHNICAL FIELD

The present invention relates to the field of communications technologies, and in particular, to D2D communications method, apparatus, and system.

BACKGROUND

As an important characteristic and a key technology in a 3rd Generation Partnership Project (3GPP) Long Term Evolution (LTE) cellular communications system, a Device-to-Device (D2D) communication technology has gradually become a research focus in a global wireless communication industry in recent years, and is highly concerned and widely studied in academic and industrial circles of wireless communication. D2D communication has the following advantages: (1) a rate of data transmission between User Equipments (UE) and a capability of information exchange between the UEs are effectively improved; (2) required radio resources are reduced and resource utilization is improved; (3) a communication delay of data exchange between UEs is effectively shortened.

D2D communication means that UEs may directly exchange information and transmit wireless data with each other by using a wireless communication link. This is different from communication in a conventional cellular network in which wireless communication between different UEs needs to be implemented by means of forwarding performed by an evolved NodeB (eNodeB). In addition, UEs outside coverage of an LTE network can also use the D2D communication technology to perform wireless communication with each other. As shown in FIG. 1A, it can be learned from FIG. 1A that UE 1 and UE 2 in network coverage can implement D2D communication, and that UE 3 and UE 4 outside the network coverage can also implement D2D communication.

A D2D communication procedure is shown in FIG. 1B. Specific steps are as follows:

Step 1: $UE_1$ obtains an SL grant (Sidelink Grant, D2D sidelink resource grant), where the SL grant is used to indicate an available D2D communication resource in a D2D communication resource pool available to the $UE_1$, and an available period of the D2D communication resource is one Sidelink Control (SC) period.

Step 2: In one SC period, the $UE_1$ uses an available SC resource in the D2D communication resource pool to send Sidelink Control Information (SCI).

The SCI is used to indicate a time-frequency location of a D2D data resource allocated in step 1, so that receive end UE 2 can determine, by decoding the received SCI, a location of a data resource used by the $UE_1$ to perform D2D data transmission.

Step 3: In one SC period, $UE_2$ receives and decodes the SCI, and determines, according to the SCI, a location of a D2D data resource used by the $UE_1$ to send D2D communication data.

Step 4: The $UE_1$ performs D2D communication by using the D2D data resource, to transmit the D2D communication data.

Step 5: The $UE_2$ receives, according to the location of the D2D data resource determined in step 3, the D2D communication data sent by the $UE_1$.

Currently, in a D2D communication process, an available period of a D2D communication resource allocated each time is only one SC period. In this case, in each SC period, a transmit end needs to redetermine a D2D communication resource, and a receive end also needs to redetermine the D2D communication resource. Therefore, D2D communication efficiency is relatively low.

SUMMARY

Embodiments of the present invention provide a D2D communications method, apparatus, and system, to resolve a problem of relatively low efficiency in a current D2D communication process.

According to a first aspect, a communication method is provided, including:

determining, by a base station, device-to-device D2D semi-persistent scheduling SPS resource information, where the D2D SPS resource information includes a D2D SPS available period and an available D2D SPS resource in a D2D communication resource pool available to a first terminal, the D2D SPS available period is a duration during which the first terminal is permitted to use the D2D SPS resource, and the D2D SPS available period is greater than one D2D sidelink control SC period; and sending, by the base station, the D2D SPS resource information to the first terminal.

With reference to the first aspect, in a first possible implementation, the D2D SPS resource information further includes an SPS indicator, and the SPS indicator is used to indicate that the D2D SPS resource information includes the D2D SPS resource and the D2D SPS available period.

With reference to the first aspect or the first possible implementation of the first aspect, in a second possible implementation, the D2D SPS resource information further includes an SPS period, and the SPS period is used to indicate a time interval for reusing the D2D SPS resource by the first terminal.

With reference to the second possible implementation of the first aspect, in a third possible implementation, before the determining, by a base station, D2D SPS resource information, the method further includes:

determining, by the base station, a D2D communication data generation period and an SC period of the first terminal; and determining, by the base station, the SPS period according to the D2D communication data generation period and the SC period.

With reference to the first aspect, or the first to the third possible implementations of the first aspect, in a fourth possible implementation, the sending, by the base station, the D2D SPS resource information to the first terminal includes:

sending, by the base station, downlink control information DCI to the first terminal, where the DCI carries the D2D SPS resource information.

With reference to the first aspect, or the first to the fourth possible implementations of the first aspect, in a fifth possible implementation, before the sending, by the base station, the D2D SPS resource information to the first terminal, the method further includes:

receiving, by the base station, a layer-2 identifier sent by a ProSe functional entity, where the layer-2 identifier is used to identify the first terminal and the second terminal as a pair of D2D communication terminals that perform one-to-one D2D communication; and forwarding, by the base station, the layer-2 identifier to the first terminal and the second terminal.

According to a second aspect, a communication method is provided, including:

determining, by a first terminal, device-to-device D2D semi-persistent scheduling SPS resource information, where the D2D SPS resource information includes a D2D SPS available period and an available D2D SPS resource in a D2D communication resource pool available to the first terminal, the D2D SPS available period is a duration during which the first terminal is permitted to use the D2D SPS resource, and the D2D SPS available period is greater than one D2D sidelink control SC period; and sending, by the first terminal, information to a second terminal in the D2D SPS available period on the D2D SPS resource.

With reference to the second aspect, in a first possible implementation, the D2D SPS resource information further includes an SPS indicator, and the SPS indicator is used to indicate that the D2D SPS resource information includes the D2D SPS resource and the D2D SPS available period; and the determining, by a first terminal, device-to-device D2D semi-persistent scheduling SPS resource information includes:

determining, by the first terminal according to the SPS indicator, that the D2D SPS resource information includes the D2D SPS resource and the D2D SPS available period.

With reference to the second aspect or the first possible implementation of the second aspect, in a second possible implementation, the D2D SPS resource information further includes an SPS period, and the SPS period is a time interval for reusing the D2D SPS resource by the first terminal; and the sending, by the first terminal, information to a second terminal in the D2D SPS available period on the D2D SPS resource includes:

sending, by the first terminal, the information to the second terminal in the D2D SPS available period on the D2D SPS resource by using the SPS period.

With reference to the second possible implementation of the second aspect, in a third possible implementation, the SPS period is related to a D2D communication data generation period and an SC period.

With reference to the second aspect, or the first to the third possible implementations of the second aspect, in a fourth possible implementation, before the sending, by the first terminal, information to a second terminal in the D2D SPS available period on the D2D SPS resource, the method further includes:

sending, by the first terminal, a D2D communication request to a ProSe entity, and receiving the layer-2 identifier that is sent by the ProSe entity by using a base station; or selecting, by the first terminal as the layer-2 identifier, a layer-2 identifier from at least one preset layer-2 identifier, where the dedicated layer-2 identifier is used to identify the first terminal and the second terminal as a pair of D2D communication terminals that perform one-to-one D2D communication.

With reference to the second aspect, or the first to the fourth possible implementations of the second aspect, in a fifth possible implementation, the determining, by a first terminal, D2D SPS resource information includes:

receiving, by the first terminal, the D2D SPS resource information sent by the base station.

With reference to the second aspect, or the first to the fifth possible implementations of the second aspect, in a sixth possible implementation, the determining, by a first terminal, D2D SPS resource information includes:

determining, by the first terminal, the D2D SPS resource information in a contention-based manner.

With reference to the sixth possible implementation of the second aspect, in a seventh possible implementation, after the determining, by a first terminal, D2D SPS resource information, the method further includes:

starting, by the first terminal, a timer; and sending, by the first terminal before the timer expires, the information to the second terminal in the D2D SPS available period on the D2D SPS resource.

With reference to the seventh possible implementation of the second aspect, in an eighth possible implementation, the method further includes:

releasing, by the first terminal, the D2D SPS resource when determining that the timer expires.

With reference to the second aspect, or the first to the eighth possible implementations of the second aspect, in a ninth possible implementation, the D2D SPS resource information includes an SC resource and a D2D SPS data resource, and the information includes SCI and D2D communication data;

the SCI includes the D2D SPS data resource and a remaining SPS time, where the remaining SPS time indicates a remaining available time that is of the D2D SPS resource and that starts from a current SC period, and the remaining SPS time is greater than one SC period; and the sending, by the first terminal, information to a second terminal in the D2D SPS available period on the D2D SPS resource includes:

sending, by the first terminal in the remaining SPS time, the SCI to the second terminal on the SC resource, and sending the D2D communication data to the second terminal on the D2D SPS data resource.

With reference to the second aspect, or the first to the ninth possible implementations of the second aspect, in a tenth possible implementation, the SCI further includes an SCI indicator, and the SCI indicator is used to indicate that the SCI includes the D2D SPS data resource and the remaining SPS time.

With reference to the ninth or the tenth possible implementation of the second aspect, in an eleventh possible implementation, the SCI further includes the SPS period, and the SPS period is the time interval for reusing the D2D SPS resource by the first terminal; and the sending, by the first terminal in the remaining SPS time, the SCI to the second terminal on the SC resource, and sending the D2D communication data to the second terminal on the D2D SPS data resource includes:

sending, by the first terminal in the remaining SPS time, the SCI to the second terminal on the SC resource, and periodically sending the D2D communication data to the second terminal on the D2D SPS data resource by using the SPS period.

According to a third aspect, a communication method is provided, including:

decoding, by a second terminal, device-to-device D2D sidelink control information SCI sent by a first terminal, where the SCI includes a remaining SPS time and an available D2D semi-persistent scheduling SPS data resource in a D2D communication resource pool available to the first terminal, the remaining SPS time indicates a remaining available time that is of the D2D SPS resource and that starts from a current SC period, and the remaining SPS time is greater than one SC period; and receiving, by the second terminal in the remaining SPS time on the D2D SPS data resource, D2D communication data sent by the first terminal.

With reference to the third aspect, in a first possible implementation, the D2D SPS resource information further includes an SPS indicator, and the SCI indicator is used to indicate that the SCI includes the D2D SPS data resource and the remaining SPS time; and before the receiving, by the second terminal in the remaining SPS time on the D2D SPS data resource, D2D communication data sent by the first terminal, the method further includes:

determining, by the second terminal according to the SCI indicator, that the SCI includes the D2D SPS data resource and the remaining SPS time.

With reference to the third aspect or the first possible implementation of the third aspect, in a second possible implementation, the SCI further includes an SPS period, and the SPS period is a time interval for reusing the D2D SPS resource by the first terminal; and the receiving, by the second terminal in the remaining SPS time on the D2D SPS data resource, D2D communication data sent by the first terminal includes:

periodically receiving, by the second terminal in the remaining SPS time on the D2D SPS data resource by using the SPS period, the D2D communication data sent by the first terminal.

With reference to the second possible implementation of the third aspect, in a third possible implementation, the SPS period is related to a D2D communication data generation period and an SC period.

With reference to the third aspect, or the first to the third possible implementations of the third aspect, in a fourth possible implementation, the SCI carries M bits of a layer-2 identifier, the D2D communication data carries N bits of the layer-2 identifier, the layer-2 identifier is used to identify the first terminal and the second terminal as a D2D communication group that performs one-to-one D2D communication, and a sum of the M bits and the N bits is equal to all bits of the layer-2 identifier; and before the receiving, by the second terminal in the remaining SPS time on the D2D SPS data resource, D2D communication data sent by the first terminal, the method further includes:

obtaining, by the second terminal, the M bits of the layer-2 identifier from the SCI;

receiving, by the second terminal, a Media Access Control MAC data packet, and obtaining the N bits of the layer-2 identifier from the MAC data packet; and determining, by the second terminal, that a layer-2 identifier obtained by combining the M bits of the layer-2 identifier obtained from the SCI and the N bits of the layer-2 identifier is the same as a stored layer-2 identifier.

With reference to the third aspect, or the first to the fourth possible implementations of the third aspect, in a fifth possible implementation, before the receiving, by the second terminal in the remaining SPS time on the D2D SPS data resource, D2D communication data sent by the first terminal, the method further includes:

receiving, by the second terminal, a layer-2 identifier sent by a base station, where the layer-2 identifier is used to identify the first terminal and the second terminal as a pair of D2D communication terminals that perform one-to-one D2D communication.

With reference to the third aspect, or the first to the fifth possible implementations of the third aspect, in a sixth possible implementation, after the receiving, by a second terminal, SCI sent by a first terminal, the method further includes:

starting, by the second terminal, a timer; and the receiving, by the second terminal in the remaining SPS time on the D2D SPS data resource, D2D communication data sent by the first terminal includes:

when the timer does not expire, receiving, by the second terminal in the remaining SPS time on the D2D SPS resource, the D2D communication data sent by the first terminal.

According to a fourth aspect, a base station is provided, including:

a processing unit, configured to determine device-to-device D2D semi-persistent scheduling SPS resource information, where the D2D SPS resource information includes a D2D SPS available period and an available D2D SPS resource in a D2D communication resource pool available to a first terminal, the D2D SPS available period is a duration during which the first terminal is permitted to use the D2D SPS resource, and the D2D SPS available period is greater than one D2D sidelink control SC period; and a sending unit, configured to send the D2D SPS resource information to the first terminal.

With reference to the fourth aspect, in a first possible implementation, the D2D SPS resource information further includes an SPS indicator, and the SPS indicator is used to indicate that the D2D SPS resource information includes the D2D SPS resource and the D2D SPS available period.

With reference to the fourth aspect or the first possible implementation of the fourth aspect, in a second possible implementation, the D2D SPS resource information further includes an SPS period, and the SPS period is used to indicate a time interval for reusing the D2D SPS resource by the first terminal.

With reference to the second possible implementation of the fourth aspect, in a third possible implementation, the processing unit is further configured to: determine a D2D communication data generation period and an SC period of the first terminal, and determine the SPS period according to the D2D communication data generation period and the SC period.

With reference to the fourth aspect, or the first to the third possible implementations of the fourth aspect, in a fourth possible implementation, that a processing unit sends the D2D SPS resource information to the first terminal is specifically:

sending downlink control information DCI to the first terminal, where the DCI carries the D2D SPS resource information.

With reference to the fourth aspect, or the first to the fourth possible implementations of the fourth aspect, in a fifth possible implementation, the base station further includes a receiving unit, configured to receive a layer-2 identifier sent by a ProSe functional entity, and the layer-2 identifier is used to identify the first terminal and the second terminal as a pair of D2D communication terminals that perform one-to-one D2D communication; and the sending unit is further configured to forward the layer-2 identifier to the first terminal and the second terminal.

According to a fifth aspect, a first terminal is provided, including:

a processing unit, configured to determine device-to-device D2D semi-persistent scheduling SPS resource information, where the D2D SPS resource information includes a D2D SPS available period and an available D2D SPS resource in a D2D communication resource pool available to the first terminal, the D2D SPS available period is a duration during which the first terminal is permitted to use the D2D SPS resource, and the D2D SPS available period is greater than one D2D sidelink control SC period; and a sending unit, configured to send information to a second terminal in the D2D SPS available period on the D2D SPS resource.

With reference to the fifth aspect, in a first possible implementation, the D2D SPS resource information further includes an SPS indicator, and the SPS indicator is used to indicate that the D2D SPS resource information includes the D2D SPS resource and the D2D SPS available period; and that a processing unit determines device-to-device D2D semi-persistent scheduling SPS resource information is specifically:

determining, according to the SPS indicator, that the D2D SPS resource information includes the D2D SPS resource and the D2D SPS available period.

With reference to the fifth aspect or the first possible implementation of the fifth aspect, in a second possible implementation, the D2D SPS resource information further includes an SPS period, and the SPS period is a time interval for reusing the D2D SPS resource by the first terminal; and that a sending unit sends information to a second terminal in the D2D SPS available period on the D2D SPS resource is specifically:

sending the information to the second terminal in the D2D SPS available period on the D2D SPS resource by using the SPS period.

With reference to the second possible implementation of the fifth aspect, in a third possible implementation, the SPS period is related to a D2D communication data generation period and an SC period.

With reference to the fifth aspect, or the first to the third possible implementations of the fifth aspect, in a fourth possible implementation, the sending unit is further configured to send a D2D communication request to a ProSe entity; and the first terminal further includes a receiving unit, configured to receive the layer-2 identifier that is sent by the ProSe entity by using a base station; or the processing unit is further configured to select, as the layer-2 identifier, a layer-2 identifier from at least one preset layer-2 identifier, where the dedicated layer-2 identifier is used to identify the first terminal and the second terminal as a pair of D2D communication terminals that perform one-to-one D2D communication.

With reference to the fifth aspect, or the first to the fourth possible implementations of the fifth aspect, in a fifth possible implementation, the first terminal further includes the receiving unit, configured to receive the D2D SPS resource information sent by the base station.

With reference to the fifth aspect, or the first to the fifth possible implementations of the fifth aspect, in a sixth possible implementation, that a processing unit determines D2D SPS resource information is specifically:

determining the D2D SPS resource information in a contention-based manner.

With reference to the sixth possible implementation of the fifth aspect, in a seventh possible implementation, the processing unit is further configured to start a timer; and the sending unit is further configured to: before the processing unit determines that the timer expires, send the information to the second terminal in the D2D SPS available period on the D2D SPS resource.

With reference to the seventh possible implementation of the fifth aspect, in an eighth possible implementation, the processing unit is further configured to release the D2D SPS resource before determining that the timer expires.

With reference to the fifth aspect, or the first to the eighth possible implementations of the fifth aspect, in a ninth possible implementation, the D2D SPS resource information includes an SC resource and a D2D SPS data resource, and the information includes SCI and D2D communication data;

the SCI includes the D2D SPS data resource and a remaining SPS time, where the remaining SPS time indicates a remaining available time that is of the D2D SPS resource and that starts from a current SC period, and the remaining SPS time is greater than one SC period; and that a sending unit sends information to a second terminal in the D2D SPS available period on the D2D SPS resource is specifically:

sending, in the remaining SPS time, the SCI to the second terminal on the SC resource, and sending the D2D communication data to the second terminal on the D2D SPS data resource.

With reference to the fifth aspect, or the first to the ninth possible implementations of the fifth aspect, in a tenth possible implementation, the SCI further includes an SCI indicator, and the SCI indicator is used to indicate that the SCI includes the D2D SPS data resource and the remaining SPS time.

With reference to the ninth or the tenth possible implementation of the fifth aspect, in an eleventh possible implementation, the SCI further includes the SPS period, and the SPS period is the time interval for reusing the D2D SPS resource by the first terminal; and the sending, by the sending unit in the remaining SPS time, the SCI to the second terminal on the SC resource, and sending the D2D communication data to the second terminal on the D2D SPS data resource is specifically:

sending, in the remaining SPS time, the SCI to the second terminal on the SC resource, and periodically sending the D2D communication data to the second terminal on the D2D SPS data resource by using the SPS period.

According to a sixth aspect, a second terminal is provided, including:

a processing unit, configured to decode device-to-device D2D sidelink control information SCI sent by a first terminal, where the SCI includes a remaining SPS time and an available D2D semi-persistent scheduling SPS data resource in a D2D communication resource pool available to the first terminal, the remaining SPS time indicates a remaining available time that is of the D2D SPS resource and that starts from a current SC period, and the remaining SPS time is greater than one SC period; and a receiving unit, configured to receive, in the remaining SPS time on the D2D SPS data resource, D2D communication data sent by the first terminal.

With reference to the sixth aspect, in a first possible implementation, the D2D SPS resource information further includes an SPS indicator, and the SCI indicator is used to indicate that the SCI includes the D2D SPS data resource and the remaining SPS time; and the processing unit is further configured to determine, according to the SCI indicator, that the SCI includes the D2D SPS data resource and the remaining SPS time.

With reference to the sixth aspect or the first possible implementation of the sixth aspect, in a second possible implementation, the SCI further includes an SPS period, and the SPS period is a time interval for reusing the D2D SPS resource by the first terminal; and that a receiving unit receives, in the remaining SPS time on the D2D SPS data resource, D2D communication data sent by the first terminal is specifically:

periodically receiving, in the remaining SPS time on the D2D SPS data resource by using the SPS period, the D2D communication data sent by the first terminal.

With reference to the second possible implementation of the sixth aspect, in a third possible implementation, the SPS period is related to a D2D communication data generation period and an SC period.

With reference to the sixth aspect, or the first to the third possible implementations of the sixth aspect, in a fourth possible implementation, the SCI carries M bits of a layer-2 identifier, the D2D communication data carries N bits of the layer-2 identifier, the layer-2 identifier is used to identify the first terminal and the second terminal as a D2D communication group that performs one-to-one D2D communication, and a sum of the M bits and the N bits is equal to all bits of the layer-2 identifier;

the processing unit is further configured to obtain the M bits of the layer-2 identifier from the SCI;

the receiving unit is further configured to receive a Media Access Control MAC data packet; and the processing unit is further configured to: obtain the N bits of the layer-2 identifier from the MAC data packet received by the receiving unit, and determine that a layer-2 identifier obtained by combining the M bits of the layer-2 identifier obtained from the SCI and the N bits of the layer-2 identifier is the same as a stored layer-2 identifier.

With reference to the sixth aspect, or the first to the fourth possible implementations of the sixth aspect, in a fifth possible implementation, the receiving unit is further configured to receive a layer-2 identifier sent by a base station, where the layer-2 identifier is used to identify the first terminal and the second terminal as a pair of D2D communication terminals that perform one-to-one D2D communication.

With reference to the sixth aspect, or the first to the fifth possible implementations of the sixth aspect, in a sixth possible implementation, the processing unit is further configured to start a timer; and that a receiving unit receives, in the remaining SPS time on the D2D SPS data resource, D2D communication data sent by the first terminal is specifically:

when the processing unit determines that the timer does not expire, receiving, in the remaining SPS time on the D2D SPS resource, the D2D communication data sent by the first terminal.

According to a seventh aspect, a communications system is provided, including the base station according to the fourth aspect, or the first to the fifth possible implementations of the fourth aspect, the first terminal according to the fifth aspect, or the first to the eleventh possible implementations of the fifth aspect, and the second terminal according to the sixth aspect, or the first to the sixth possible implementations of the sixth aspect.

The embodiments of the present invention provide a D2D communication method. In the solution, the D2D SPS available period of the D2D SPS resource available to the first terminal is greater than one SC period, and in the D2D SPS available period, the first terminal needs to determine the D2D SPS resource only one time, and the second terminal also needs to decode the SCI only one time to determine the D2D SPS resource. In this way, the first terminal does not need to determine a D2D SPS resource in each SC period, and the second terminal also does not need to decode SCI in each SC period to determine the D2D SPS resource. Therefore, D2D communication efficiency is improved.

DESCRIPTION OF EMBODIMENTS

Figure 1A:
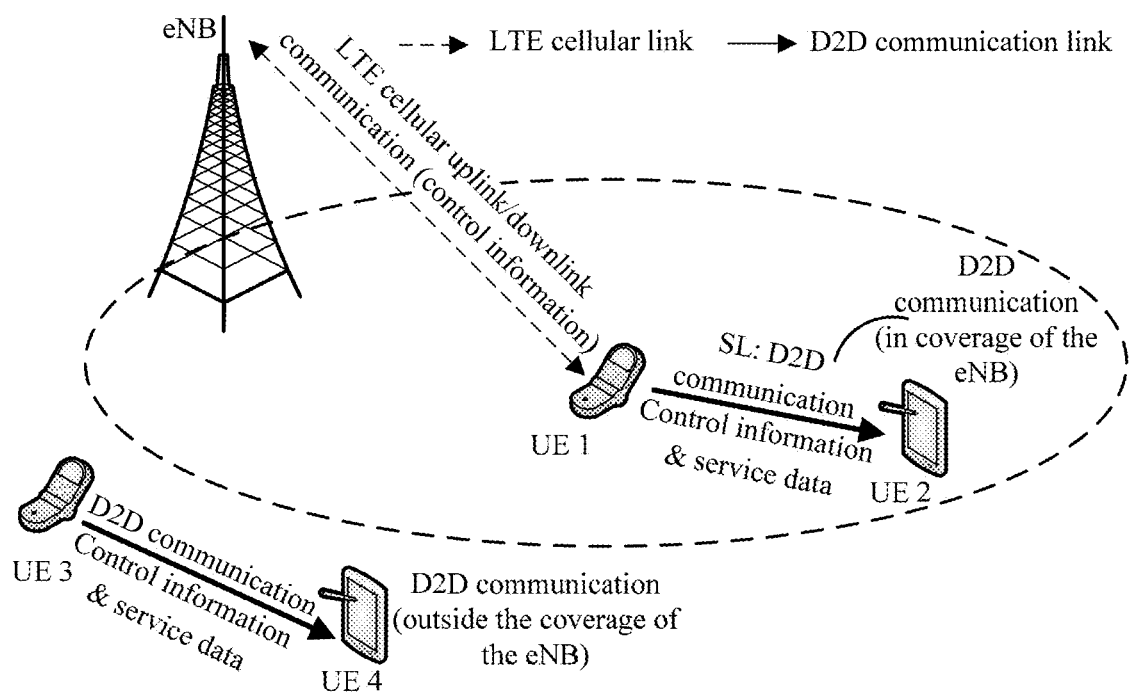
FIG. 1A is an architecture diagram of a D2D communication scenario in the prior art.
Figure 1B:
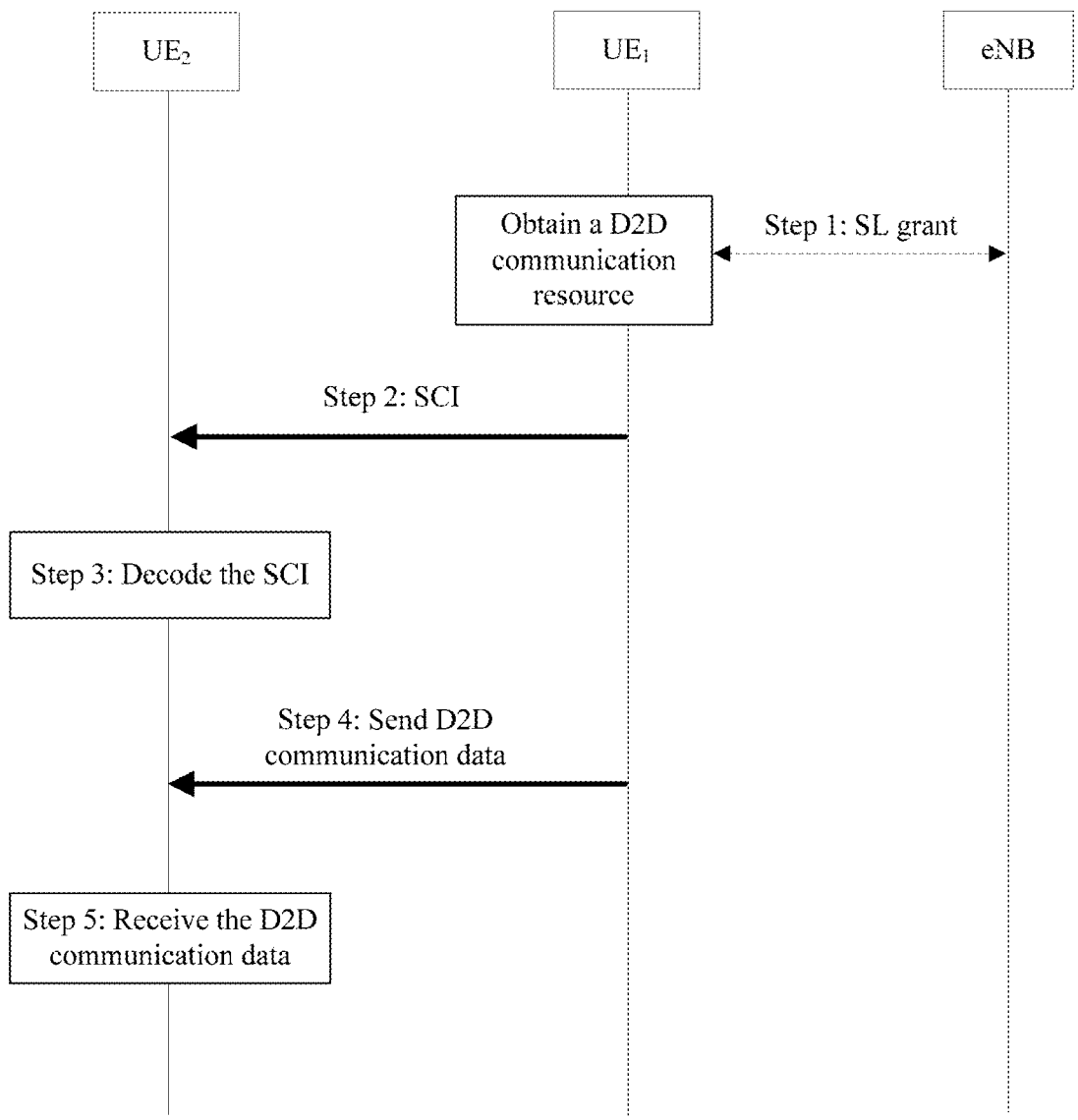
FIG. 1B is a flowchart of D2D communication in the prior art.

To make the objectives, technical solutions, and advantages of the present invention clearer, the following further describes the present invention in detail with reference to the accompanying drawings. Apparently, the described embodiments are merely some but not all of the embodiments of the present invention. All other embodiments obtained by persons of ordinary skill in the art based on the embodiments of the present invention without undue experiment shall fall within the protection scope of the present invention.

For ease of understanding of the solutions described in the present invention, technical terms and applicable scenarios used in the present invention are briefly described below.

Technical terms used in the present invention are as follows:

D2D communication: D2D communication means that UEs can directly perform information exchange and wireless data transmission with each other by using a wireless communication link. This is different from conventional cellular communication in which data and information are forwarded by a base station.

D2D communication data: D2D communication data is service data transmitted by UE by means of D2D communication.

ProSe function: In an existing 3GPP protocol, a ProSe function is a network node located on a core network side in an LTE system, and is configured to authorize UE and perform parameter configuration for the UE in D2D communication. As a network node, the ProSe function may be an independent device, or may be a functional module of a device.

Network side: A network side is an LTE network and a related network node. In the present invention, the network side mainly includes a base station, an Mobile Management Entity (MME), and a ProSe function, or another node.

A wireless communication resource and a corresponding resource allocation mechanism that are used in D2D communication are key factors affecting D2D communication performance. A base station configures several "D2D communication resource pools" dedicated to D2D communication, to avoid interference caused by D2D communication to cellular communication in an existing LTE network. A "resource pool" is a set of time and frequency resources used for wireless communication. The "D2D communication resource pool" includes two resource pools, and the two resource pools are in a time sequence. A resource included in the former resource pool is referred to as an "SC resource", and is used to transmit SCI related to resource scheduling and allocation. A resource included in the latter resource pool is referred to as a "D2D data resource", and is used by UE to transmit D2D communication data. Each D2D communication resource pool has a period referred to as a "D2D SC period", and the D2D communication resource pool is periodically reused according to a corresponding D2D SC period.

In D2D communication, a dedicated "layer-2 identifier" with a length of 24 bits is further allocated to each UE, and is used for D2D communication addressing between UEs. D2D communication addressing means that a transmit end adds the "layer-2 identifier" to SCI and D2D communication data that are to be sent, and when receiving data, a receive end selectively receives, according to a "layer-2 identifier" obtained by means of decoding, data sent by particular UE that performs D2D communication with the receive end, so as to avoid incorrectly receiving D2D communication data that is not related to the receive end.

Specifically, when sending the D2D communication data, the transmit end adds the first eight bits of the "layer-2 identifier" to the to-be-sent SCI, and adds remaining 16 bits to a header of a Media Access Control (MAC) data packet that is to be transmitted on a D2D data resource indicated by the SCI. Correspondingly, when receiving D2D data, the receive end first performs decoding to obtain the eight bits of the "layer-2 identifier" from the SCI, and performs decoding to selectively obtain the remaining 16 bits from the header of the MAC data packet that is received on the resource indicated by the SCI. Only when the "layer-2 identifier" obtained by means of decoding completely matches a "layer-2 identifier" of the receive end UE, the receive end determines that corresponding D2D communication data is indeed from the transmit end that performs D2D communication with the receive end, and receive the D2D communication data; otherwise, the receive end does not receive the D2D communication data.

In an existing D2D communications system, for UE in coverage of a base station, the base station allocates a "layer-2 identifier" by using a network node "ProSe function", and sends the "layer-2 identifier" to the UE by using a PC3 interface. For UE outside the coverage of the base station, a corresponding "layer-2 identifier" of the UE is preconfigured in the UE.

System architectures or scenarios to which the present invention is applicable are as follows:

According to current 3GPP related standard and technical specifications, a main application scenario of D2D communication is "one-to-one" D2D communication. As shown in FIG. 1A, "one-to-one" D2D communication is a D2D communication manner in which two particular UEs perform matching and synchronization before performing D2D communication, to form a "D2D communication pair", and then transmit information based on unicast (Uni-cast). In "one-to-one" communication, transmit end UE sends D2D communication data to particular UE. Correspondingly, receive end UE receives the data sent by the particular UE. As shown in FIG. 1A, $UE_1$ and $UE_2$ that are in coverage of an LTE network may perform matching and synchronization under control of the network by exchanging signaling with a base station, to form a D2D communication pair to perform D2D communication by multiplexing a frequency band of an LTE system. $UE_3$ and $UE_4$ that are outside the coverage of the LTE network may autonomously perform matching and synchronization by transmitting a D2D synchronization signal between the $UE_3$ and the $UE_4$ or by using an existing short-range wireless communication technology (such as Bluetooth), to form a D2D communication pair to perform out of coverage D2D communication on a frequency spectrum preconfigured by a network operator.

Specific network elements used in the present invention are as follows:

Base station: A main function of the base station is to implement wireless communication and a related control function that are of UE in an LTE system.

Terminal: A main function of the terminal is to implement wireless data sending and receiving of a mobile subscriber (in the present invention, the terminal is mainly UE that performs D2D communication).

Base station scheduler: A main function of the base station scheduler is to coordinate multiple user equipments (Ues) and allocate radio resources in an LTE system.

The following describes preferred implementations of the present invention in detail with reference to the accompanying drawings. It should be understood that the preferred embodiments described herein are merely used to describe and explain the present invention, but are not intended to limit the present invention. In addition, the embodiments in this application and features in the embodiments may be mutually combined if they do not conflict with each other.

Figure 2:
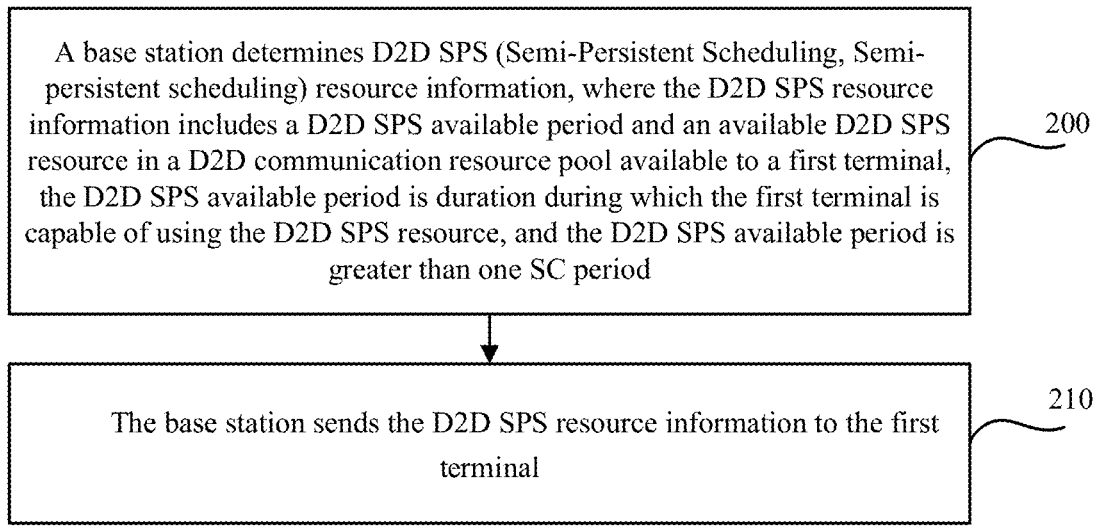
FIG. 2 is a communication flowchart according to an embodiment of the present invention.

The following describes the embodiments of the present invention in detail with reference to the accompanied drawings. Referring to FIG. 2, in an embodiment of the present invention, a specific procedure of a D2D communication method is as follows:

Step 200: A base station determines D2D Semi-Persistent Scheduling (SPS) resource information, where the D2D SPS resource information includes a D2D SPS available period and an available D2D SPS resource in a D2D communication resource pool available to a first terminal, the D2D SPS available period is a duration during which the first terminal is permitted to use the D2D SPS resource, and the D2D SPS available period is greater than one SC period.

Step 210: The base station sends the D2D SPS resource information to the first terminal.

In this embodiment of the present invention, the D2D SPS resource available to the first terminal may be one resource or may be a resource group including at least two resources. This is not specifically limited herein. A resource includes a time domain resource and/or a frequency domain resource.

For example, the D2D SPS resource available to the first terminal includes a first resource, and the first resource includes a subframe 1 and a frequency band 1. In this case, a subframe available to the first terminal is the subframe 1, a frequency band available to the first terminal is the frequency band 1. Alternatively, the D2D SPS resource available to the first terminal includes a first resource, a second resource, and a third resource. The first resource includes a subframe 1 and a frequency band 1, the second resource includes a subframe 3 and a frequency band 2, and the third resource includes a subframe 5 and a frequency band 5. In this case, subframes available to the first terminal are the subframe 1, the subframe 3, and the subframe 5, and frequency bands available to the first terminal are the frequency band 1, the frequency band 2, and the frequency band 5.

In the example described above, a resource includes both a time domain resource and a frequency domain resource. Certainly, a resource may alternatively include only a time domain resource or only a frequency domain resource.

For example, the D2D SPS resource available to the first terminal includes a first resource, a second resource, a third resource, a fourth resource, a fifth resource, and a sixth resource. The first resource includes a subframe 1, the second resource includes a frequency band 1, the third resource includes a subframe 3, the fourth resource includes a frequency band 2, the fifth resource includes a subframe 5, and the sixth resource includes a frequency band 5. In this case, subframes available to the first terminal are the subframe 1, the subframe 3, and the subframe 5, and frequency bands available to the first terminal are the frequency band 1, the frequency band 2, and the frequency band 5.

In this embodiment of the present invention, optionally, an SC period may be used as a basic unit of the D2D SPS available period. That is, the D2D SPS available period may be X SC periods, and X is a positive number greater than or equal to 1.

For example, the D2D SPS available period may be 10 SC periods, may be 20 SC periods, or may be 30 SC periods, and certainly, may be another quantity of SC periods. This is not specifically limited herein.

In this embodiment of the present invention, further, the D2D SPS resource information further includes an SPS indicator, and the SPS indicator is used to indicate that the D2D SPS resource information includes the D2D SPS resource and the D2D SPS available period.

In this embodiment of the present invention, further, the D2D SPS resource information further includes an SPS period, and the SPS period is a time interval for reusing the D2D SPS resource by the first terminal.

In this embodiment of the present invention, optionally, an SC period is used as a basic unit of the SPS period. That is, the SPS period may be X SC periods, and X is a positive number greater than or equal to 1.

For example, the SPS period may be one SC period, may be two SC periods, or may be three SC periods, and certainly, may be another quantity of SC periods. This is not specifically limited herein.

It is described in step 200 to step 210 that the base station indicates, to the first terminal, the D2D SPS resource available to the first terminal. Therefore, the first terminal is in coverage of the base station. In this case, the base station further needs to send, to the first terminal, information about the D2D communication resource pool available to the first terminal. Therefore, in this embodiment of the present invention, further, before the base station determines the D2D SPS resource information, the method further includes the following operation:

sending, by the base station, an Radio Resource Control (RRC) message to the first terminal, where the RRC message carries the information about the D2D communication resource pool available to the first terminal.

Further, the RRC message may further carry first indication information. The first indication information is used to instruct the first terminal to obtain, by means of notification of the base station, the D2D SPS resource available to the first terminal instead of obtaining the D2D SPS resource in a contention-based manner.

Because a second terminal also needs to determine a D2D communication resource pool, the base station also needs to send the RRC message to the second terminal. After both the first terminal and the second terminal determine the D2D communication resource pool, configuration of the D2D communication resource pool is completed.

Further, after sending the RRC message to the first terminal, the base station further needs to perform the following operations:

receiving, by the base station, a D2D ProSe Buffer Status Report (BSR) sent by the first terminal, and reporting an amount of data that needs to be transmitted in D2D communication.

In this embodiment of the present invention, further, before the base station determines the D2D SPS resource information, the method further includes the following operations:

determining, by the base station, a D2D communication data generation period and an SC period of the first terminal; and determining, by the base station, the SPS period according to the D2D communication data generation period and the SC period.

For example, the SPS period is set to a least common multiple of the D2D communication data generation period and the SC period.

In this embodiment of the present invention, the base station may use the following manner to determine the D2D communication data generation period of the first terminal:

determining, by the base station according to a scheduling request sent by the first terminal, that to-be-transmitted D2D communication data of the first terminal has a periodical generation characteristic and needs to be periodically scheduled; and obtaining the D2D communication data generation period.

For example, the base station may obtain the corresponding D2D communication data generation period by sensing a frequency of reporting the scheduling request by the first terminal and a data amount reported in the ProSe BSR.

For another example, the base station may determine, by using an Logical Channel Group Identity (LCGID) included in the ProSe BSR sent by the first terminal, that the to-be-transmitted D2D communication data of the first terminal is a type of data having a periodical characteristic, such as Voice over Internet Protocol (VoIP) voice data or streaming media, so as to obtain the D2D communication data generation period.

In this embodiment of the present invention, optionally, the base station may use the following manner to send the D2D SPS resource information to the first terminal:

sending, by the base station, Downlink Control Information (DCI) to the first terminal, where the DCI carries the D2D SPS resource information.

For example, the D2D SPS resource information includes the DCI, and the DCI may be shown in Table 1.

TABLE 1

Schematic diagram of a DCI format
DCI format

| Fields | Size (bits) | Remarks |
| --- | --- | --- |
| Frequency hopping identifier | 1 | Indicates whether to use uplink frequency hopping mode in the 3GPP Rel-8 version |
| Frequency domain resource allocation | 5-13 | Indicates resource block allocation in a frequency domain, where a specific quantity of bits in the domain depends on system bandwidth |
| Time domain resource pattern | 7 | Indicates a pattern of time domain resource (subframe) allocation |
| SC resource index | 6 | Indicates an index of an SC resource used to transmit SCI |
| Transmit power control indication | 1 | Indicates whether to perform power control |
| SPS indicator | 1 | Indicates whether an allocated resource is a D2D SPS resource |
| SPS available period | 4 (e.g.) | Indicates an available time of a D2D SPS resource and is in a basic unit of a quantity of SC periods (for example, the SPS available period is 16 consecutive SC periods) |
| SPS period | 2 (e.g.) | Indicates a time interval for reusing an SPS resource and is in a basic unit of an SC period (for example, the SPS resource is reused every four SC periods) |

In this embodiment of the present invention, if the D2D SPS resource information includes the SPS indicator, the D2D SPS resource information is carried in the DCI, when receiving the DCI, the first terminal determines, according to the SPS indicator, that the DCI is not DCI in the prior art, but is DCI including the D2D SPS resource information.

In this embodiment of the present invention, before the base station sends the D2D SPS resource information to the first terminal, the method further includes the following operations:

receiving, by the base station, a layer-2 identifier sent by a ProSe functional entity, where the layer-2 identifier is used to identify the first terminal and the second terminal as a pair of D2D communication terminals that perform one-to-one D2D communication; and forwarding, by the base station, the layer-2 identifier to the first terminal and the second terminal.

That is, in a one-to-one D2D communication scenario, the first terminal and the second terminal need to have an identity that can only be recognized by each other, and the identity needs to be allocated by the base station to the two terminals.

Optionally, the base station may send the layer-2 identifier to the first terminal and the second terminal by using a PC3 interface.

In this embodiment of the present invention, after sending the D2D SPS resource information to the first terminal, the base station further needs to perform the following operations:

starting, by the base station, a timer; and when the timer expires, releasing the D2D SPS resource allocated to the first terminal.

In this embodiment of the present invention, it is described in the above process that the first terminal is in the coverage of the base station, and determines the D2D SPS resource by means of indication of the base station instead of obtaining the D2D SPS resource in a contention-based manner.

Certainly, in actual application, the following case may alternatively be included: The first terminal is in the coverage of the base station, and obtains the D2D SPS resource in a contention-based manner instead of determining the D2D SPS resource by means of indication of the base station. In this case, the base station does not send the D2D SPS resource information to the first terminal, but may send the RRC message to the first terminal. The RRC message carries the information about the D2D communication resource pool available to the first terminal.

Further, the RRC message may alternatively carry second indication information. The second indication information is used to instruct the first terminal to obtain the D2D SPS resource in a contention-based manner instead of obtaining, by means of notification of the base station, the D2D SPS resource available to the first terminal.

In the solution, the D2D SPS available period of the D2D SPS resource available to the first terminal is greater than one SC period, and in the D2D SPS available period, the first terminal needs to determine the D2D SPS resource only once, and the second terminal also needs to decode the SCI only once to determine the D2D SPS resource. In this way, the first terminal does not need to determine a D2D SPS resource in each SC period, and the second terminal also does not need to decode SCI in each SC period to determine the D2D SPS resource. Therefore, D2D communication efficiency is improved.

Figure 3:
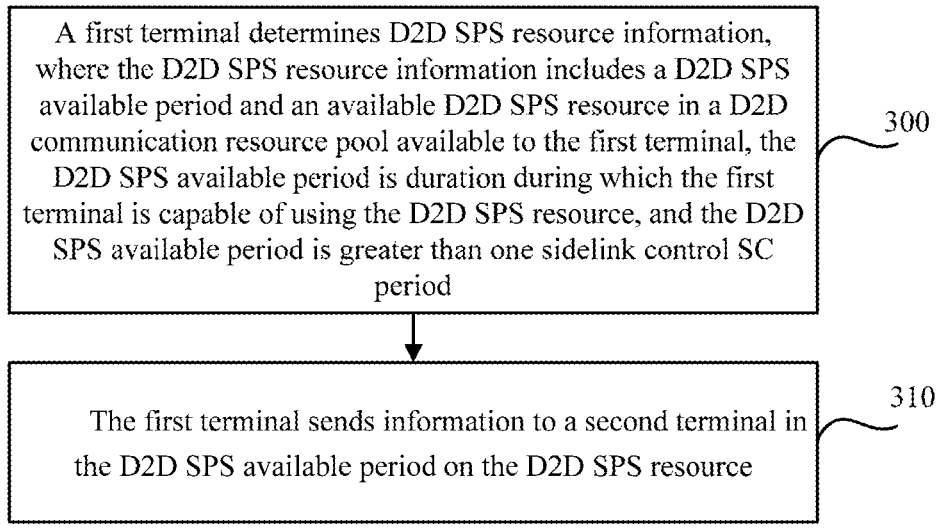
FIG. 3 is another communication flowchart according to an embodiment of the present invention.

Referring to FIG. 3, in an embodiment of the present invention, a specific procedure of another D2D communication method is as follows:

Step 300: A first terminal determines D2D SPS resource information, where the D2D SPS resource information includes a D2D SPS available period and an available D2D SPS resource in a D2D communication resource pool available to the first terminal, the D2D SPS available period is a duration during which the first terminal is permitted to use the D2D SPS resource, and the D2D SPS available period is greater than one sidelink control SC period.

Step 310: The first terminal sends information to a second terminal in the D2D SPS available period on the D2D SPS resource.

In this embodiment of the present invention, the D2D SPS resource available to the first terminal may be one resource or may be a resource group including at least two resources. This is not specifically limited herein. A resource includes a time domain resource and/or a frequency domain resource.

For example, the D2D SPS resource available to the first terminal includes a first resource, and the first resource includes a subframe 1 and a frequency band 1. In this case, a subframe available to the first terminal is the subframe 1, a frequency band available to the first terminal is the frequency band 1. Alternatively, the D2D SPS resource available to the first terminal includes a first resource, a second resource, and a third resource. The first resource includes a subframe 1 and a frequency band 1, the second resource includes a subframe 3 and a frequency band 2, and the third resource includes a subframe 5 and a frequency band 5. In this case, subframes available to the first terminal are the subframe 1, the subframe 3, and the subframe 5, and frequency bands available to the first terminal are the frequency band 1, the frequency band 2, and the frequency band 5.

In the example described above, a resource includes both a time domain resource and a frequency domain resource. Certainly, a resource may alternatively include only a time domain resource or only a frequency domain resource.

For example, the D2D SPS resource available to the first terminal includes a first resource, a second resource, a third resource, a fourth resource, a fifth resource, and a sixth resource. The first resource includes a subframe 1, the second resource includes a frequency band 1, the third resource includes a subframe 3, the fourth resource includes a frequency band 2, the fifth resource includes a subframe 5, and the sixth resource includes a frequency band 5. In this case, subframes available to the first terminal are the subframe 1, the subframe 3, and the subframe 5, and frequency bands available to the first terminal are the frequency band 1, the frequency band 2, and the frequency band 5.

The first terminal determines the D2D communication resource pool in two manners. In a first manner, the D2D communication resource pool is obtained by using an RRC message; in a second manner, the D2D communication resource pool is obtained in a preconfiguration manner.

It should be noted that, if the first terminal obtains the D2D communication resource pool by using an RRC message sent by a base station, the first terminal may obtain the D2D SPS resource by means of indication of the base station, or may obtain the D2D SPS resource in a contention-based manner. If the first terminal obtains the D2D communication resource pool in a pre-configuration manner, the first terminal can obtain the D2D SPS resource only in a contention-based manner. In this embodiment of the present invention, in order that the first terminal quickly determines that the D2D SPS resource information includes the D2D SPS resource and the D2D SPS available period, the D2D SPS resource information further includes an SPS indicator. The SPS indicator is used to indicate that the D2D SPS resource information includes the D2D SPS resource and the D2D SPS available period.

In this case, the first terminal may use the following manner to determine the device-to-device D2D SPS resource information:

determining, by the first terminal according to the SPS indicator, that the D2D SPS resource information includes the D2D SPS resource and the D2D SPS available period.

That is, after determining the SPS indicator, the first terminal learns that the D2D SPS resource information includes the following content: the D2D SPS resource and the D2D SPS available period, and then sends the information by using the D2D SPS resource information instead of sending the information in an existing manner.

In this embodiment of the present invention, the D2D SPS resource information further includes an SPS period. The SPS period is a time interval for reusing the D2D SPS resource by the first terminal.

Optionally, the first terminal may use the following manner to send the information to the second terminal in the D2D SPS available period on the D2D SPS resource:

sending, by the first terminal, the information to the second terminal in the D2D SPS available period on the D2D SPS resource by using the SPS period.

In this embodiment of the present invention, optionally, the SPS period is related to a D2D communication data generation period and an SC period.

This embodiment of the present invention is applied to a one-to-one D2D communication scenario. Therefore, before sending the information to the second terminal, the first terminal further needs to be matched with the second terminal. In this way, the first terminal and the second terminal know a specific terminal with which they perform D2D communication.

In this embodiment of the present invention, the first terminal may be matched with the second terminal by using the base station or in a contention-based manner. Therefore, before the first terminal sends the information to the second terminal in the D2D SPS available period on the D2D SPS resource, the method further includes the following operations:

sending, by the first terminal, a D2D communication request to a ProSe entity, and receiving a layer-2 identifier that is sent by the ProSe entity by using the base station; or selecting, by the first terminal as a layer-2 identifier of the first terminal, a layer-2 identifier from at least one preset layer-2 identifier, where the dedicated layer-2 identifier is used to identify the first terminal and the second terminal as a pair of D2D communication terminals that perform one-to-one D2D communication.

In this embodiment of the present invention, optionally, the D2D communication request may be an Object Management Architecture (OMA) terminal management message.

Further, after sending the D2D communication request to the ProSe entity, the first terminal may further obtain identities of the first terminal and the second terminal. The identity of the first terminal may be an International Mobile Subscriber Identity (IMSI), a corresponding mobile communication telephone number, or the like. The identity of the second terminal may be an IMSI, a corresponding mobile communication telephone number, or the like.

In this embodiment of the present invention, optionally, when receiving the layer-2 identifier that is sent by the ProSe entity by using the base station, the first terminal receives, by using a PC3 interface, the layer-2 identifier that is sent by the ProSe entity by using the base station.

In this embodiment of the present invention, the first terminal may determine the D2D SPS resource by means of indication of the base station, or may obtain the D2D SPS resource in a contention-based manner. Therefore, the first terminal may use the following manner to determine the D2D SPS resource information:

receiving, by the first terminal, the D2D SPS resource information sent by the base station.

In this embodiment of the present invention, optionally, the first terminal may use the following manner to receive the D2D SPS resource information sent by the base station:

receiving, by the first terminal, DCI sent by the base station, where the DCI includes the D2D SPS resource information.

That is, the D2D SPS resource information is carried in the DCI.

It should be noted that, when the first terminal obtains the D2D SPS resource based means of indication of the base station, if the first terminal is in coverage of the base station, the first terminal further needs to receive the RRC message sent by the base station. The RRC message carries information about the D2D communication resource pool available to the first terminal.

Further, the RRC message may further carry first indication information. The first indication information is used to instruct the first terminal to obtain, by means of notification of the base station, the D2D SPS resource available to the first terminal instead of obtaining the D2D SPS resource in a contention-based manner.

In this embodiment of the present invention, the first terminal and the second terminal exchange SCI and corresponding D2D communication data in the D2D communication resource pool.

Alternatively, the first terminal may use the following manner to determine the D2D SPS resource information:

determining, by the first terminal, the D2D SPS resource information in a contention-based manner.

It should be noted that when the first terminal determines the D2D SPS resource information in a contention-based manner, the first terminal may be in the coverage of the base station or may be outside the coverage of the base station. When the first terminal is in the coverage of the base station, the first terminal may obtain the D2D communication resource pool by means of indication of the base station. When the first terminal is outside the coverage of the base station, the first terminal may obtain the D2D communication resource pool in a pre-configuration manner.

When the first terminal is in the coverage of the base station, the base station may use the RRC message to indicate the D2D communication resource pool to the first terminal. Further, the RRC message may carry the first indication information or second indication information. The first indication information is used to instruct the first terminal to obtain, by means of notification of the base station, the D2D SPS resource available to the first terminal instead of obtaining, in a contention-based manner, the D2D SPS resource available to the first terminal. The second indication information is used to instruct the first terminal to obtain, in a contention-based manner, the D2D SPS resource available to the first terminal instead of obtaining, by means of notification of the base station, the D2D SPS resource available to the first terminal.

In this embodiment of the present invention, when the first terminal is in the coverage of the base station, the first terminal first obtains, by reading system information sent by the base station, information about several D2D communication resource pools configured by the base station for D2D communication. In these resource pools, the base station preconfigures a specified D2D communication resource pool (for example, the first one of all D2D communication resource pools) for all terminals in the coverage of the base station, and the specified D2D communication resource pool is dedicated to sending or receiving in "one-to-one" D2D communication.

A terminal outside the coverage of the base station contends for a resource in a D2D communication resource pool corresponding to a preconfigured frequency spectrum.

To avoid resource waste, in this embodiment of the present invention, after the first terminal determines the D2D SPS resource information, the method further includes the following operations:

starting, by the first terminal, a timer; and sending, by the first terminal before the timer expires, the information to the second terminal in the D2D SPS available period on the D2D SPS resource.

Further, the method further includes the following operation:

releasing, by the first terminal, the D2D SPS resource when determining that the timer expires.

In this embodiment of the present invention, when the timer maintained by the first terminal expires, the first terminal considers that D2D communication with the second terminal ends, and that the D2D SPS resource is unavailable, and immediately stops sending D2D communication data to the second terminal.

In this embodiment of the present invention, optionally, the D2D SPS resource information includes an SC resource and a D2D SPS data resource, and the information includes SCI and D2D communication data. The SCI includes the D2D SPS data resource and a remaining SPS time. The remaining SPS time indicates a remaining available time that is of the D2D SPS resource and that starts from a current D2D SC period, and the remaining SPS time is greater than one D2D SC period.

Optionally, the first terminal may use the following manner to send the information to the second terminal in the D2D SPS available period on the D2D SPS resource:

sending, by the first terminal in the D2D SPS available period, the SCI to the second terminal on the SC resource, and sending the D2D communication data to the second terminal on the D2D SPS data resource.

In this embodiment of the present invention, optionally, the remaining SPS time may be calculated by using Formula 1 below:

$$\text{Remaining SPS time} = N_{SPS\text{-}Due} - \Delta N_{SC} \qquad \text{(Formula 1)}$$

where $N_{SPS\text{-}Due}$ represents the D2D SPS available period, and $\Delta N_{SC}$ represents a time difference between an end moment of a current SC period and a start moment at which the first terminal performs D2D communication by using the D2D SPS resource.

Each time SCI is transmitted, $\Delta N_{SC}$ is set to a start moment of an SC period to which the SCI belongs, so as to calculate the remaining SPS time based on $\Delta N_{SC}$, and the remaining SPS time is included in the SCI for sending.

Further, in order that the second terminal quickly determines the SCI, the SCI further includes an SCI indicator. The SCI indicator is used to indicate that the SCI includes the D2D SPS data resource and the remaining SPS time.

Further, the SCI further includes the SPS period, and the SPS period is a time interval for reusing the D2D SPS resource by the first terminal.

The sending, by the first terminal in the remaining SPS time, the SCI to the second terminal on the SC resource, and sending the D2D communication data to the second terminal on the D2D SPS data resource includes:

sending, by the first terminal in the remaining SPS time, the SCI to the second terminal on the SC resource, and periodically sending the D2D communication data to the second terminal on the D2D SPS data resource by using the SPS period.

In this embodiment of the present invention, when the SCI includes the D2D SPS data resource, the SPS period, the remaining SPS time, and the SCI indicator, a format of the SCI may be shown in Table 2.

TABLE 2

Schematic diagram of an SCI format
SCI Format 0a

| Fields | Size (bits) | Remarks |
| --- | --- | --- |
| Frequency hopping identifier | 1 | Indicates whether to use uplink frequency hopping mode in the 3GPP Rel-8 version |
| Frequency domain resource allocation | 5-13 | Indicates resource block allocation in a frequency domain, where a specific quantity of bits in the domain depends on system bandwidth |
| Time domain resource pattern | 7 | Indicates a pattern of time domain resource (subframe) allocation |
| Timing alignment | 6 | Used for D2D link timing alignment |
| Modulation and coding scheme | 5 | Indicates a modulation and coding scheme used for a D2D link |
| Layer 1 identifier | 8 | Used for physical layer filtering of received D2D data |
| SPS indicator | 1 | Indicates whether an allocated resource is a D2D SPS resource |
| Remaining SPS time | 4 (e.g.) | Indicates an available time of a D2D SPS resource and is in a basic unit of a quantity of SC periods (for example, the remaining SPS time is 16 consecutive SC periods) |
| SPS period | 2 (e.g.) | Indicates a time interval for reusing an SPS resource and is in a basic unit of an SC period (for example, the SPS resource is reused every four SC periods) |

Optionally, when the SPS indicator is "1", it indicates that the SCI is different from existing SCI. The D2D SPS data resource, the SPS period, and the remaining SPS time may be determined from the SCI.

When the remaining SPS time is "000", it indicates that one SC period remains. When the remaining SPS time is "001", it indicates that two SC periods remain.

Similarly, when the SPS period is "000", it indicates that the SPS period is one SC period; when the SPS period is "001", it indicates that the SPS period is two SC periods.

In this embodiment of the present invention, to shorten a D2D communication delay, when periodically sending the information to the second terminal in the D2D SPS available period on the D2D SPS resource by using the SPS period, the first terminal uses, as a start moment, the first SC period after the D2D SPS resource information is determined, to periodically send the information to the second terminal on the D2D SPS resource by using the SPS period.

In this embodiment of the present invention, before sending the information to the second terminal, the first terminal needs to establish an RRC connection to enter an RRC connected state. After entering the RRC connected state, the first terminal sends a service request to a network side by using the base station. After the network side receives the service request, a network node Mobility Management Entity (MME) initiates paging for the called second terminal, and the base station sends a paging message to the second terminal.

Optionally, a method for implementing the RRC connection establishment process may be as follows:

Step 1: The first terminal sends an RRC connection request message to the base station.

Step 2: The base station sends an RRC connection request establishment message to the first terminal.

Step 3: The first terminal sends an RRC connection establishment complete message to the base station, to complete RRC connection establishment, and the first terminal enters a connected state.

All information related to RRC connection establishment is exchanged by using RRC signaling between the first terminal and the base station.

It should be noted that, if the first terminal is outside the coverage of the base station, there is no need to perform the foregoing RRC connection establishment process. If the first terminal is in the coverage of the base station, the foregoing RRC connection establishment process may be performed.

The service request reported by the first terminal to the network side by using the base station may be added to a Non-Access Stratum (NAS) message. The service request indicates that a type of a requested service is a "one-to-one" D2D communication service, and the service request further includes an identity of the called second terminal, such as a mobile communication telephone number corresponding to the called second terminal.

The MME on the network side obtains the identity of the called second terminal by means of decoding to initiate paging for the called second terminal. The base station sends a paging message to the called second terminal to address the called second terminal, so as to trigger the called second terminal to establish an RRC connection.

In the solution, the D2D SPS available period of the D2D SPS resource available to the first terminal is greater than one SC period, and in the D2D SPS available period, the first terminal needs to determine the D2D SPS resource only one time, and the second terminal also needs to decode the SCI only one time to determine the D2D SPS resource. In this way, the first terminal does not need to determine a D2D SPS resource in each SC period, and the second terminal also does not need to decode SCI in each SC period to determine the D2D SPS resource. Therefore, D2D communication efficiency is improved.

Figure 4:
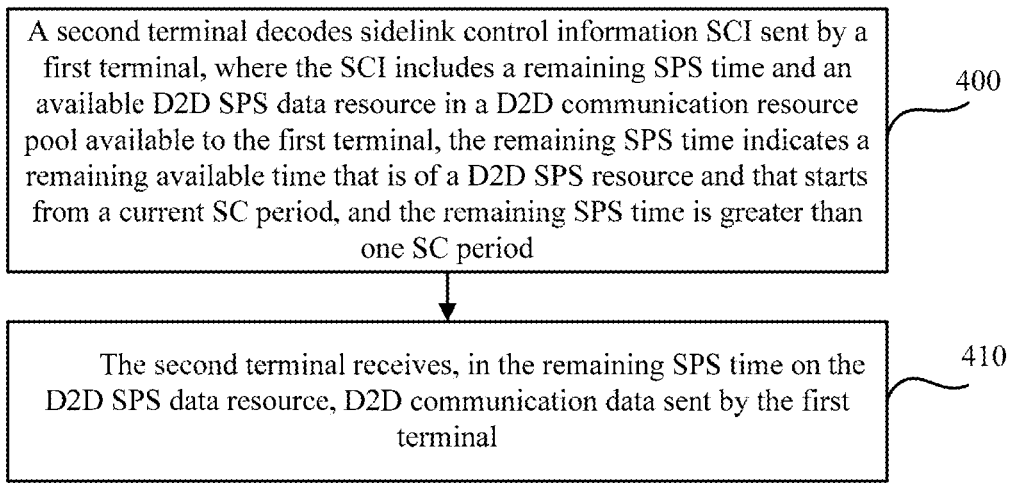
FIG. 4 is another communication flowchart according to an embodiment of the present invention.

Referring to FIG. 4, in an embodiment of the present invention, a specific procedure of another D2D communication method is as follows:

Step 400: A second terminal decodes sidelink control information SCI sent by a first terminal, where the SCI includes a remaining SPS time and an available D2D SPS data resource in a D2D communication resource pool available to the first terminal, the remaining SPS time indicates a time period during which the D2D SPS resource is available and that starts from a current SC period, and the remaining SPS time is greater than one SC period.

Step 410: The second terminal receives, in the remaining SPS time on the D2D SPS data resource, D2D communication data sent by the first terminal.

Further, in order that the second terminal quickly determines the D2D SPS resource information, the D2D SPS resource information further includes an SPS indicator. The SCI indicator is used to indicate that the SCI includes the D2D SPS data resource and the remaining SPS time.

In this case, before the second terminal receives, in the remaining SPS time on the D2D SPS data resource, the D2D communication data sent by the first terminal, the method further includes the following operation:

determining, by the second terminal according to the SCI indicator, that the SCI includes the D2D SPS data resource and the remaining SPS time.

Further, the SCI further includes an SPS period, and the SPS period is a time interval for reusing the D2D SPS resource by the first terminal.

That the second terminal receives, in the remaining SPS time on the D2D SPS data resource, D2D communication data sent by the first terminal includes:

periodically receiving, by the second terminal in the remaining SPS time on the D2D SPS data resource by using the SPS period, the D2D communication data sent by the first terminal.

In this embodiment of the present invention, optionally, the SPS period is related to a D2D communication data generation period and an SC period.

In this embodiment of the present invention, optionally, the SCI carries M bits of a layer-2 identifier, and the D2D communication data carries N bits of the layer-2 identifier. The layer-2 identifier is used to identify the first terminal and the second terminal as a D2D communication group that performs one-to-one D2D communication. A sum of the M bits and the N bits is equal to all bits of the layer-2 identifier.

Before the second terminal receives, in the remaining SPS time on the D2D SPS data resource, the D2D communication data sent by the first terminal, the method further includes:

obtaining, by the second terminal, the M bits of the layer-2 identifier from the SCI;

receiving, by the second terminal, a MAC data packet, and obtaining the N bits of the layer-2 identifier from the MAC data packet; and determining, by the second terminal, that a layer-2 identifier obtained by combining the M bits of the layer-2 identifier obtained from the SCI and the N bits of the layer-2 identifier is the same as a stored layer-2 identifier.

In this embodiment of the present invention, before the second terminal receives, in the remaining SPS time on the D2D SPS data resource, the D2D communication data sent by the first terminal, the method further includes the following operation:

receiving, by the second terminal, a layer-2 identifier sent by a base station, where the layer-2 identifier is used to identify the first terminal and the second terminal as a pair of D2D communication terminals that perform one-to-one D2D communication.

Further, after the second terminal receives the SCI sent by the first terminal, the method further includes the following operation:

starting, by the second terminal, a timer.

In this case, optionally, the second terminal may use the following manner to receive, in the remaining SPS time on the D2D SPS data resource, the D2D communication data sent by the first terminal:

when the timer does not expire, receiving, by the second terminal in the remaining SPS time on the D2D SPS resource, the D2D communication data sent by the first terminal.

That is, when the timer maintained by the second terminal expires, the second terminal immediately stops receiving the D2D communication data sent by the first terminal, and considers that D2D communication with the first terminal ends, and that the D2D SPS resource is unavailable.

In this embodiment of the present invention, before the second terminal decodes the SCI, the method further includes the following operations:

receiving, by the second terminal, a paging message sent by the base station, and establishing an RRC connection according to the paging message to enter an RRC connected state.

In the solution, after receiving the SCI from the first terminal for the first time, the second terminal continues decoding the corresponding SCI in the remaining SPS time, and determines, according to the SCI information obtained by means of decoding, a location of a D2D SPS data resource in the remaining SPS time, to obtain the D2D SPS data resource used by the first terminal to transmit the D2D communication data in the remaining SPS time. The remaining SPS time is greater than one SC period. Therefore, the second terminal does not need to decode SCI in each SC period, SCI decoding complexity is reduced, and D2D communication efficiency is improved.

Figure 5A:
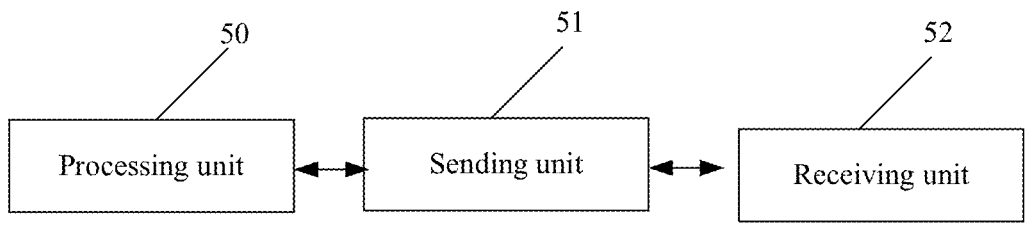
FIG. 5A is a schematic diagram of a base station according to an embodiment of the present invention.

Referring to FIG. 5A, in an embodiment of the present invention, a base station is provided. The base station includes a processing unit 50 and a sending unit 51.

The processing unit 50 is configured to determine device-to-device D2D semi-persistent scheduling SPS resource information, where the D2D SPS resource information includes a D2D SPS available period and an available D2D SPS resource in a D2D communication resource pool available to a first terminal, the D2D SPS available period is a duration during which the first terminal is permitted to use the D2D SPS resource, and the D2D SPS available period is greater than one D2D sidelink control SC period.

The sending unit 51 is configured to send the D2D SPS resource information to the first terminal.

In this embodiment of the present invention, further, the D2D SPS resource information further includes an SPS indicator. The SPS indicator is used to indicate that the D2D SPS resource information includes the D2D SPS resource and the D2D SPS available period.

In this embodiment of the present invention, optionally, the D2D SPS resource information further includes an SPS period. The SPS period is used to indicate a time interval for reusing the D2D SPS resource by the first terminal.

In this embodiment of the present invention, further, the processing unit 50 is further configured to: determine a D2D communication data generation period and an SC period of the first terminal, and determine the SPS period according to the D2D communication data generation period and the SC period.

In this embodiment of the present invention, optionally, that the processing unit 50 sends the D2D SPS resource information to the first terminal is specifically:

sending downlink control information DCI to the first terminal, where the DCI carries the D2D SPS resource information.

In this embodiment of the present invention, further, the base station further includes a receiving unit 52, configured to receive a layer-2 identifier sent by a ProSe functional entity, and the layer-2 identifier is used to identify the first terminal and a second terminal as a pair of D2D communication terminals that perform one-to-one D2D communication.

The sending unit 51 is further configured to forward the layer-2 identifier to the first terminal and the second terminal.

Figure 5B:
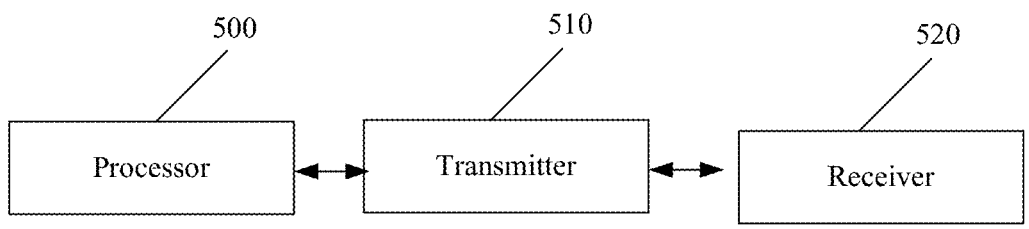
FIG. 5B is another schematic diagram of a base station according to an embodiment of the present invention.

Referring to FIG. 5B, in an embodiment of the present invention, a schematic diagram of a base station is provided. The base station includes a processor 500 and a transmitter 510.

The processor 500 is configured to determine device-to-device D2D semi-persistent scheduling SPS resource information, where the D2D SPS resource information includes a D2D SPS available period and an available D2D SPS resource in a D2D communication resource pool available to a first terminal, the D2D SPS available period is a duration during which the first terminal is permitted to use the D2D SPS resource, and the D2D SPS available period is greater than one D2D sidelink control SC period.

The transmitter 510 is configured to send the D2D SPS resource information to the first terminal.

It should be noted that the processor 500 is further configured to perform another operation performed by the processing unit 50, and the transmitter 510 is further configured to perform another operation performed by the sending unit 51. The base station further includes a receiver 520, configured to perform an operation performed by the receiving unit 52.

Figure 6A:
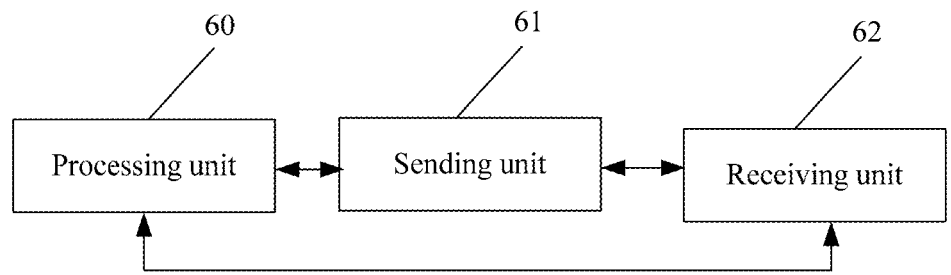
FIG. 6A is a schematic diagram of a first terminal according to an embodiment of the present invention.

Referring to FIG. 6A, in an embodiment of the present invention, a schematic diagram of a first terminal is provided. The first terminal includes a processing unit 60 and a sending unit 61.

The processing unit 60 is configured to determine device-to-device D2D semi-persistent scheduling SPS resource information, where the D2D SPS resource information includes a D2D SPS available period and an available D2D SPS resource in a D2D communication resource pool available to the first terminal, the D2D SPS available period is a duration during which the first terminal is permitted to use the D2D SPS resource, and the D2D SPS available period is greater than one D2D sidelink control SC period.

The sending unit 61 is configured to send information to a second terminal in the D2D SPS available period on the D2D SPS resource.

In this embodiment of the present invention, further, the D2D SPS resource information further includes an SPS indicator. The SPS indicator is used to indicate that the D2D SPS resource information includes the D2D SPS resource and the D2D SPS available period.

That the processing unit 60 determines device-to-device D2D semi-persistent scheduling SPS resource information is specifically:

determining, according to the SPS indicator, that the D2D SPS resource information includes the D2D SPS resource and the D2D SPS available period.

In this embodiment of the present invention, further, the D2D SPS resource information further includes an SPS period, and the SPS period is a time interval for reusing the D2D SPS resource by the first terminal.

That the sending unit 61 sends information to a second terminal in the D2D SPS available period on the D2D SPS resource is specifically:

sending the information to the second terminal in the D2D SPS available period on the D2D SPS resource by using the SPS period.

In this embodiment of the present invention, optionally, the SPS period is related to a D2D communication data generation period and an SC period.

In this embodiment of the present invention, further, the sending unit 61 is further configured to send a D2D communication request to a ProSe entity.

The first terminal further includes a receiving unit 62, configured to receive a layer-2 identifier that is sent by the ProSe entity by using a base station.

Alternatively, the processing unit 60 is further configured to select, as a layer-2 identifier, a layer-2 identifier from at least one preset layer-2 identifier, where the dedicated layer-2 identifier is used to identify the first terminal and the second terminal as a pair of D2D communication terminals that perform one-to-one D2D communication.

In this embodiment of the present invention, further, the first terminal further includes the receiving unit 62, configured to receive the D2D SPS resource information sent by the base station.

In this embodiment of the present invention, optionally, that the processing unit 60 determines D2D SPS resource information is specifically:

determining the D2D SPS resource information in a contention-based manner.

In this embodiment of the present invention, further, the processing unit 60 is further configured to start a timer.

The sending unit 61 is further configured to: before the processing unit 60 determines that the timer expires, send the information to the second terminal in the D2D SPS available period on the D2D SPS resource.

In this embodiment of the present invention, further, the processing unit 60 is further configured to release the D2D SPS resource before determining that the timer expires.

In this embodiment of the present invention, optionally, the D2D SPS resource information includes an SC resource and a D2D SPS data resource, and the information includes SCI and D2D communication data.

The SCI includes the D2D SPS data resource and a remaining SPS time. The remaining SPS time indicates a remaining available time that is of the D2D SPS resource and that starts from a current SC period, and the remaining SPS time is greater than one SC period.

That the sending unit 61 sends information to a second terminal in the D2D SPS available period on the D2D SPS resource is specifically:

sending, in the remaining SPS time, the SCI to the second terminal on the SC resource, and sending the D2D communication data to the second terminal on the D2D SPS data resource.

In this embodiment of the present invention, further, the SCI further includes an SCI indicator. The SCI indicator is used to indicate that the SCI includes the D2D SPS data resource and the remaining SPS time.

In this embodiment of the present invention, further, the SCI further includes the SPS period, and the SPS period is the time interval for reusing the D2D SPS resource by the first terminal.

The sending, by the sending unit 61 in the remaining SPS time, the SCI to the second terminal on the SC resource, and sending the D2D communication data to the second terminal on the D2D SPS data resource is specifically:

sending, in the remaining SPS time, the SCI to the second terminal on the SC resource, and periodically sending the D2D communication data to the second terminal on the D2D SPS data resource by using the SPS period.

Figure 6B:
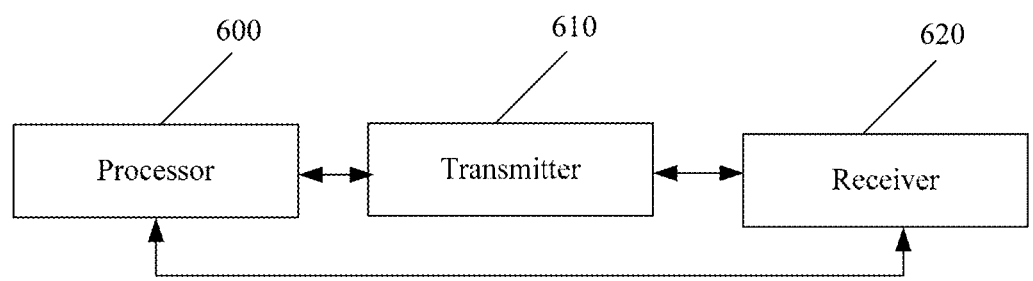
FIG. 6B is another schematic diagram of a first terminal according to an embodiment of the present invention.

Referring to FIG. 6B, in an embodiment of the present invention, a schematic diagram of a terminal device is provided. The terminal device includes a processor 600 and a transmitter 610.

The processor 600 is configured to determine device-to-device D2D semi-persistent scheduling SPS resource information, where the D2D SPS resource information includes a D2D SPS available period and an available D2D SPS resource in a D2D communication resource pool available to a first terminal, the D2D SPS available period is a duration during which the first terminal is permitted to use the D2D SPS resource, and the D2D SPS available period is greater than one D2D sidelink control SC period.

The transmitter 610 is configured to send information to a second terminal in the D2D SPS available period on the D2D SPS resource.

It should be noted that the processor 600 is further configured to perform another operation performed by the processing unit 60, and the transmitter 610 is further configured to perform another operation performed by the sending unit 61. The terminal device further includes a receiver 620, configured to perform an operation performed by the receiving unit 62.

Figure 7A:
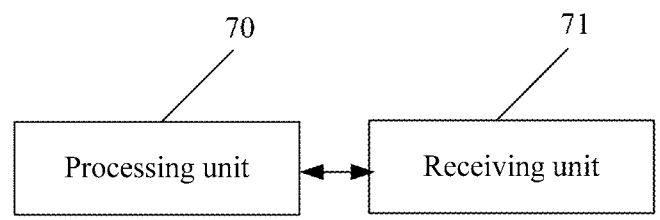
FIG. 7A is a schematic diagram of a second terminal according to an embodiment of the present invention.

Referring to FIG. 7A, in an embodiment of the present invention, a second terminal is provided. The second terminal includes a processing unit 70 and a receiving unit 71.

The processing unit 70 is configured to decode device-to-device D2D sidelink control information SCI sent by a first terminal, where the SCI includes a remaining SPS time and an available D2D semi-persistent scheduling SPS data resource in a D2D communication resource pool available to the first terminal, the remaining SPS time indicates a time period during which the D2D SPS resource is available and that starts from a current SC period, and the remaining SPS time is greater than one SC period.

The receiving unit 71 is configured to receive, in the remaining SPS time on the D2D SPS data resource, D2D communication data sent by the first terminal.

In this embodiment of the present invention, further, the D2D SPS resource information further includes an SPS indicator. The SCI indicator is used to indicate that the SCI includes the D2D SPS data resource and the remaining SPS time.

The processing unit 70 is further configured to determine, according to the SCI indicator, that the SCI includes the D2D SPS data resource and the remaining SPS time.

In this embodiment of the present invention, further, the SCI further includes an SPS period, and the SPS period is the time interval for reusing the D2D SPS resource by the first terminal.

That the receiving unit 71 receives, in the remaining SPS time on the D2D SPS data resource, D2D communication data sent by the first terminal is specifically:

periodically receiving, in the remaining SPS time on the D2D SPS data resource by using the SPS period, the D2D communication data sent by the first terminal.

In this embodiment of the present invention, optionally, the SPS period is related to a D2D communication data generation period and an SC period.

In this embodiment of the present invention, optionally, the SCI carries M bits of a layer-2 identifier, and the D2D communication data carries N bits of the layer-2 identifier. The layer-2 identifier is used to identify the first terminal and the second terminal as a D2D communication group that performs one-to-one D2D communication. A sum of the M bits and the N bits is equal to all bits of the layer-2 identifier.

The processing unit 70 is further configured to obtain the M bits of the layer-2 identifier from the SCI.

The receiving unit 71 is further configured to receive a Media Access Control MAC data packet.

The processing unit 70 is further configured to: obtain the N bits of the layer-2 identifier from the MAC data packet received by the receiving unit 71, and determine that a layer-2 identifier obtained by combining the M bits of the layer-2 identifier obtained from the SCI and the N bits of the layer-2 identifier is the same as a stored layer-2 identifier.

In this embodiment of the present invention, further, the receiving unit 71 is further configured to receive a layer-2 identifier sent by a base station, where the layer-2 identifier is used to identify the first terminal and the second terminal as a pair of D2D communication terminals that perform one-to-one D2D communication.

In this embodiment of the present invention, further, the processing unit 70 is further configured to start a timer.

That the receiving unit 71 receives, in the remaining SPS time on the D2D SPS data resource, D2D communication data sent by the first terminal is specifically:

when the processing unit 70 determines that the timer does not expire, receiving, in the remaining SPS time on the D2D SPS resource, the D2D communication data sent by the first terminal.

Figure 7B:
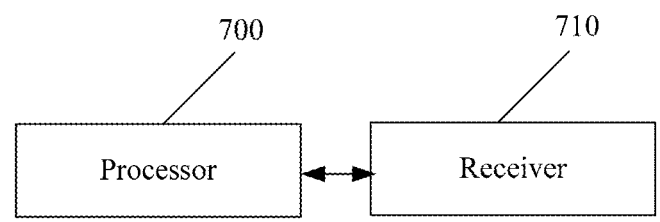
FIG. 7B is another schematic diagram of a second terminal according to an embodiment of the present invention.

Referring to FIG. 7B, in an embodiment of the present invention, a schematic diagram of a second terminal is provided. The second terminal includes a processor 700 and a receiver 710.

The processor 700 is configured to decode device-to-device D2D sidelink control information SCI sent by a first terminal, where the SCI includes a remaining SPS time and an available D2D semi-persistent scheduling SPS data resource in a D2D communication resource pool available to the first terminal, the remaining SPS time indicates a remaining available time that is of the D2D SPS resource and that starts from a current SC period, and the remaining SPS time is greater than one SC period.

The receiver 710 is configured to receive, in the remaining SPS time on the D2D SPS data resource, D2D communication data sent by the first terminal.

It should be noted that the processor 700 is further configured to perform another operation performed by the processing unit 70, and the receiver 710 is further configured to perform another operation performed by the receiving unit 71.

In an embodiment of the present invention, a communications system is further provided, and the communications system includes the base station shown in FIG. 5A or FIG. 5B, the first terminal shown in FIG. 6A or FIG. 6B, and the second terminal shown in FIG. 7A or FIG. 7B.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A communication method, comprising:
    determining a device-to-device (D2D) Semi-Persistent Scheduling (SPS) available period and an available D2D SPS resource in a D2D communication resource pool available to a first terminal, the D2D SPS available period being a duration during which the first terminal is permitted to use the D2D SPS resource, and the D2D SPS available period being greater than one D2D sidelink control (SC) period; and
    sending the D2D SPS available period and the available D2D SPS resource to the first terminal.

2. The method according to claim 1, wherein the method further comprising:
    sending an SPS indicator to the first terminal, and the SPS indicator indicates that the D2D SPS resource information comprises the D2D SPS resource and the D2D SPS available period.

3. The method according to claim 1, wherein the method further comprising:
    sending downlink control information (DCI) to the first terminal, wherein the DCI carries the D2D SPS resource information.

4. A communication method, comprising:
    determining, by a first terminal, a device-to-device (D2D) Semi-Persistent Scheduling (SPS) available period and an available D2D SPS resource in a D2D communication resource pool available to the first terminal, the D2D SPS available period being a duration during which the first terminal is permitted to use the D2D SPS resource, and the D2D SPS available period being greater than one D2D sidelink control (SC) period; and
    sending, by the first terminal, information to a second terminal in the D2D SPS available period on the D2D SPS resource.

5. The method according to claim 4, wherein the method further comprising:
    determining, by a first terminal, an SPS period, and the SPS period is a time interval for reusing the D2D SPS resource by the first terminal; and, wherein
    sending, by the first terminal, information to the second terminal in the D2D SPS available period on the D2D SPS resource comprises:
    sending, by the first terminal, the information to the second terminal in the D2D SPS available period on the D2D SPS resource by using the SPS period.

6. The method according to claim 4, wherein the method further comprising:
    receiving, by the first terminal, the D2D SPS resource information from a base station.

7. The method according to claim 4, wherein the determining, by a first terminal, a D2D SPS available period and an available D2D SPS resource comprises:
    determining, by the first terminal, the D2D SPS available period and the available D2D SPS resource in a contention-based manner.

8. The method according to claim 7, wherein the method further comprises:
    starting, by the first terminal, a timer; and
    sending, by the first terminal before the timer expires, the information to the second terminal in the D2D SPS available period on the D2D SPS resource.

9. A communication method, comprising:
    receiving, by a second terminal, a remaining SPS time and an available device-to-device (D2D) semi-persistent scheduling (SPS) data resource in a D2D communication resource pool available to the first terminal, the remaining SPS time indicates a time period during which the D2D SPS resource is available, the time period starting from a current SC period, and the remaining SPS time is greater than one SC period; and
    receiving, by the second terminal in the remaining SPS time on the D2D SPS data resource, D2D communication data sent by the first terminal.

10. The method according to claim 9, wherein the method further comprising:
    receiving, by a second terminal, an SPS period, and the SPS period is a time interval for reusing the D2D SPS resource by the first terminal; and, wherein
    receiving, by the second terminal in the remaining SPS time on the D2D SPS data resource, D2D communication data sent by the first terminal comprises:
    periodically receiving, by the second terminal in the remaining SPS time on the D2D SPS data resource by using the SPS period, the D2D communication data from the first terminal.

11. A base station, comprising:
    a processor, configured to determine a D2D SPS available period and an available device-to-device (D2D) Semi-Persistent Scheduling (SPS) resource in a D2D communication resource pool available to a first terminal, the D2D SPS available period being a duration during which the first terminal is permitted to use the D2D SPS resource, and the D2D SPS available period being greater than one D2D sidelink control (SC) period; and a transmitter, configured to send the D2D SPS available period and the available D2D SPS resource to the first terminal.

12. The base station according to claim 11, wherein the method further comprising:

the transmitter, further configured to send an SPS indicator, and the SPS indicator indicates that the D2D SPS resource information comprises the D2D SPS resource and the D2D SPS available period.

13. The base station according to claim 11, wherein the transmitter, further configured to send downlink control information (DCI) to the first terminal, wherein the DCI carries the D2D SPS resource information.

14. A first terminal, comprising:

a processor, configured to determine a D2D SPS available period and an available device-to-device (D2D) Semi-Persistent Scheduling (SPS) resource in a D2D communication resource pool available to the first terminal, the D2D SPS available period being a duration during which the first terminal is permitted to use the D2D SPS resource, and the D2D SPS available period being greater than one D2D sidelink control (SC) period; and a transmitter, configured to send information to a second terminal in the D2D SPS available period on the D2D SPS resource.

15. The first terminal according to claim 14, wherein the transmitter, further configured to send an SPS period, and the SPS period is a time interval for reusing the D2D SPS resource by the first terminal; and the transmitter, further configured to send the information to the second terminal in the D2D SPS available period on the D2D SPS resource by using the SPS period.

16. The first terminal according to claim 14, wherein the first terminal further comprising a receiver, the receiver, configured to receive the D2D SPS resource information from the base station.

17. The first terminal according to claim 14, wherein the processor, configured to determine the D2D SPS resource information in a contention-based manner.

18. The first terminal according to claim 17, wherein the processor, further configured to start a timer; and the transmitter, further configured to: before the processor determines that the timer expires, send the information to the second terminal in the D2D SPS available period on the D2D SPS resource.

19. A second terminal, comprising:

a receiver, configured to receive a remaining Semi-Persistent Scheduling (SPS) time and an available device-to-device (D2D) SPS data resource in a D2D communication resource pool available to the first terminal, the remaining SPS time indicating a remaining available time that is of the D2D SPS resource and that starts from a current SC period, and the remaining SPS time being greater than one SC period; and the receiver, further configured to receive, in the remaining SPS time on the D2D SPS data resource, D2D communication data from the first terminal.

20. The second terminal according to claim 19, wherein, the receiver, further configured to receive an SPS period, and the SPS period is a time interval for reusing the D2D SPS resource by the first terminal; and the receiver, further configured to periodically receiving, in the remaining SPS time on the D2D SPS data resource by using the SPS period, the D2D communication data from the first terminal.

* * * * *